UNITED STATES PATENT OFFICE.

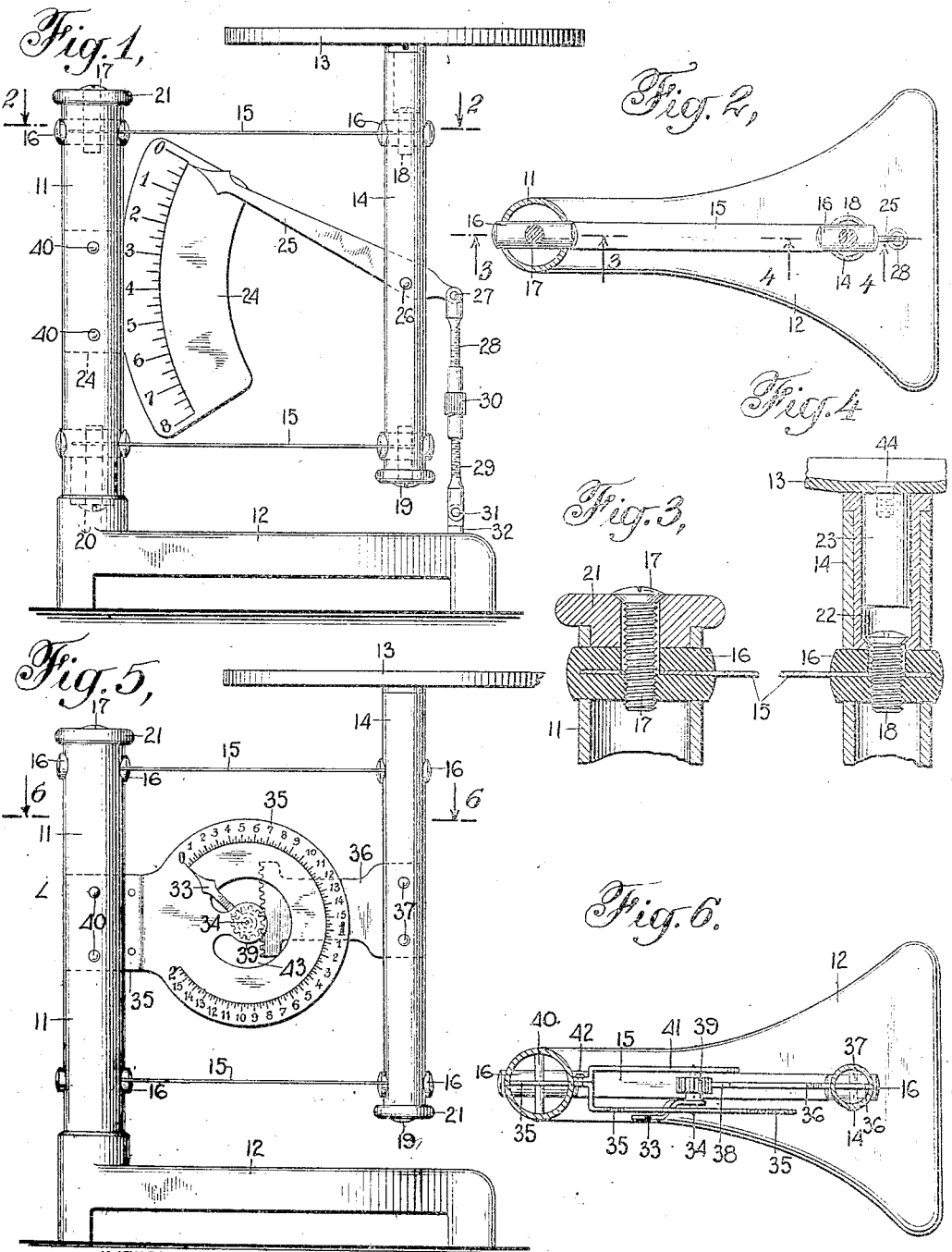

TIMOTHY B. POWERS, OF NEW YORK, N. Y.

WEIGHING-SCALE.

1,159,416.  Specification of Letters Patent.  Patented Nov. 9, 1915.

Application filed November 25, 1914. Serial No. 873,854.

*To all whom it may concern:*

Be it known that I, TIMOTHY B. POWERS, a citizen of the United States, and a resident of the city of New York, borough of Manhattan, in the county and State of New York, have invented a new and Improved Weighing-Scales, of which the following is a full, clear, and exact description.

Among the principal objects which the present invention has in view are: To eliminate frictional resistance in the working or moving elements of the apparatus; to provide an apparatus of the character mentioned having a simplified and durable structure; to provide a registering mechanism, simplified in construction and accurate in operation; to provide means for justifying said scales; and to provide yielding supports operatively connected in substantially parallel relation.

*Drawings.*—Figure 1 is a side view of weighing scales constructed and arranged in accordance with the present invention; Fig. 2 is a horizontal section taken on the line 2—2 in Fig. 1; Fig. 3 is a detail view on an enlarged scale, of the head of the supporting standard, the section being taken as on the line 3—3 in Fig. 2; Fig. 4 is a detail view on an enlarged scale of the upper end of the scale pan spindle, the section being taken as on the line 4—4 in Fig. 2; Fig. 5 is a side elevation of weighing scales constructed and arranged in accordance with a modified form of the invention. Fig. 6 is a horizontal section taken on the line 6—6 in Fig. 5.

*Description.*—In both the preferred and modified forms of the invention a supporting standard 11 is employed. The standards 11 are both rigidly mounted or integrally secured upon a base 12. Each form of the invention is also provided with a scale pan 13, which is supported upon a spindle 14. The spindle 14 in each form is operatively connected with the standard 11 by two flat springs 15. The springs 15, standard 11 and spindle 14 are preferably disposed in rectangular relation, as shown best in Figs. 1 and 5 of the drawings.

The springs 15 are secured in the standards 11 and spindles 14 as best shown in Figs. 3 and 4 of the drawings, wherein there are shown split clamping plugs 16. To hold the plugs 16, the standards 11 and the spindles 14 are each perforated to receive snugly said plugs. The plugs 16 are perforated, and the perforations are tapped to register with the screw-threads of screws 17, 18, 19 and 20. The screw 17 is supported at the upper end of the standard 11 by a cap plug 21, which provides a finish for said standard, as well as a support for said screw. When the screw is tightened the cap plug 21 is drawn firmly upon the plug 16 with which said screw 17 is engaged.

The screw 18 is similarly mounted in the plug 16 holding the outer end of the upper spring 15. As shown best in Fig. 4 of the drawings, the spindle 14 extends above the upper spring 15 and the plug 16 thereof. To hold the head of the screw 18, therefore, it becomes necessary that a hollow filler piece 22 shall be used, the inner end of said piece being contracted to provide a seat for the head of the screw 18. The piece 22 also affords a mounting for a plug 23, which is rigidly held by a short screw 44, to the scale pan 13. The provisions made for holding the screws 17 and 18 in position are duplicated to hold the screws 19 and 20 in place. In all of the devices thus employed an effort has been made to avoid straining or cramping the plugs 16, thereby likewise avoiding the introduction into the springs of torsional or other disturbing stresses. In each case the plugs 21 and 23 are provided with sufficient length to rest firmly in the plugs 16 before closing or tightening upon the ends of the standards 11 or spindles 14.

The springs 15 may be of any desired strength. Where the scales are employed for handling heavy weights, springs of heavier grade, or of greater strength, are employed. Also, the graduated plates are variously subdivided, the proportionate movement of the lighter and heavier springs varying in conformity with the work performed. Thus, in the scales illustrated in Fig. 1 of the drawings the springs 15 are light in character, the maximum deflection thereof being produced by a weight not exceeding 8 ounces. This deflection is measured on a graduated plate 24 by a pointer 25. The pointer 25 is pivotally connected by a pin 26 to the spindle 14. The fulcrum of the pointer 25 is a connecting pin 27 at the upper end of a screw bolt 28.

The bolt 28 is coupled as a unit with a companion bolt 29, said bolts each having a screw thereon, oppositely pitched, the threads whereof register with an elongated nut 30 which, when manipulated, serves to expand or contract the combined length of the bolts 28 and 29.

The rectangular arrangement of the springs 15, standard 11 and spindle 14 produces a movement in the spindle 14 to and from the standard 11. It is to accommodate this movement that the swinging fulcrum formed by the bolts 28 and 29 and the nut 30, is provided for the pointer 25. To provide the necessary freedom of rock of the combined bolts 28 and 29 and nut 30, the bolt 29 is pivoted by means of a pin 31 on a short lug 32, best seen in Fig. 1 of the drawings.

In the modified form of the invention, as seen best in Fig. 5 of the drawings, the pointer 25 is replaced by a relatively short pointer 33. The pointer 33 is pivotally mounted by a spindle shaft 34 to swing over a graduated plate 35. The plate 35 is provided with a series of relatively smaller graduations accumulated to register up to two pounds. The movement of the spindle 14 is approximately the same in the construction shown in Fig. 5 of the drawings as in that shown in Fig. 1, while the relative movement of the pointer 33 is around a greatly magnified arc.

To move the pointer 33 the spindle 14 in the modified form is provided with an extended plate 36, to which it is rigidly secured by pins 37, said plate being inserted in a slot cut or otherwise provided therefor in said spindle. The inner end of the plate 36 is provided with a gear toothed rack 38, the teeth whereof mesh with the teeth of a small gear pinion 39, which pinion is fixedly mounted on the spindle shaft 34, to which the pointer 33 is also rigidly connected. The graduated plates 24 and 35 are both rigidly held by means of pins 40 in the standards 11.

In the construction of the modified form shown in Figs. 5 and 6, the plate 35 is slightly offset from the median vertical plane of the apparatus, to permit the registration of the pinion 39 with the teeth of the rack 38 on the plate 36. To form bearings for the spindle shaft 34, a bracket plate 41 is provided, said bracket plate being rigidly secured by screws 42 or by small rivets, to said plate 35, as seen best in Fig. 6 of the drawings.

The pointer 33 extends through a segment slot 43 formed in the plate 35 concentric with the bearing of the shaft 34, said slot being co-extensive with the graduated markings on the plate 35.

Claims:

1. An apparatus as characterized, comprising a horizontally-disposed scale pan; a vertically-disposed spindle rigidly connected with said pan for supporting the same; a vertically-disposed supporting standard; a plurality of flat springs disposed in parallel relation, said springs being rigidly connected with said standard and said spindle, and operating to preserve the parallel relation of said spindle and said standard; an index plate mounted on said standard, extending toward said spindle and having impressed thereon graduate scale markings; and a pointer pivotally mounted on an independent support, said pointer being adapted to move over the graduated markings on said index plate, said pointer being pivotally connected with said spindle intermediate said index plate and said independent support.

2. An apparatus as characterized, comprising a horizontally-disposed scale pan; a vertically-disposed spindle rigidly connected with said pan for supporting the same; a vertically-disposed supporting standard; a plurality of flat springs disposed in parallel relation, said springs being rigidly connected with said standard and said spindle, and operating to preserve the parallel relation of said spindle and said standard; an index plate mounted on said standard, extending toward said spindle and having impressed thereon graduated scale markings; a pointer having a free end to move over the impressed surface of said index plate, and pivotally connected with said spindle intermediate the ends of said pointer; and a swinging rod pivotally connected with the outer end of said pointer to permit a lengthwise movement of said pointer.

3. An apparatus as characterized, comprising a scale pan; a vertically-disposed spindle rigidly connected with said pan; a vertically-disposed standard; a base supporting said standard and extending beneath said pan; a plurality of flat supporting springs connecting said spindle and said standard, said springs being rigidly attached to said spindle and standard and spaced apart in parallel relation and forming with said spindle and standard a substantially rectangular space; a graduated plate rigidly mounted on said standard between said springs and in a plane coincident therewith; a movable pointer operatively disposed with reference to said plate and between said springs and in a plane coincident therewith; and means operatively connecting said pointer and said spindle, for moving said pointer over said plate in correspondence with the movement of said spindle.

In testimony whereof I have signed my name to this specification in the presence of two subscribing witnesses.

TIMOTHY B. POWERS.

Witnesses:
E. F. MURDOCK,
G. H. EMSLIE.